US008010592B2

(12) United States Patent
Albers

(10) Patent No.: US 8,010,592 B2
(45) Date of Patent: Aug. 30, 2011

(54) METHOD FOR TESTING THE REAL-TIME CAPABILITY OF A SYSTEM

(75) Inventor: Karsten Albers, Oldenburg (DE)

(73) Assignee: Inchron GmbH, Potsdam (DE)

( * ) Notice: Subject to any disclaimer, the term of this patent is extended or adjusted under 35 U.S.C. 154(b) by 1217 days.

(21) Appl. No.: 11/579,828

(22) PCT Filed: May 10, 2005

(86) PCT No.: PCT/EP2005/005037
§ 371 (c)(1), (2), (4) Date: Jan. 18, 2007

(87) PCT Pub. No.: WO2005/111807
PCT Pub. Date: Nov. 24, 2005

(65) Prior Publication Data
US 2008/0040171 A1    Feb. 14, 2008

(30) Foreign Application Priority Data

May 11, 2004   (DE) .......................... 10 2004 023 738
Nov. 9, 2004   (DE) .......................... 10 2004 053 979

(51) Int. Cl.
*G06F 15/16* (2006.01)

(52) U.S. Cl. ........ 709/201; 709/203; 709/220; 709/223; 709/227

(58) Field of Classification Search .................. 709/201, 709/203, 220, 223, 227, 122, 125
See application file for complete search history.

(56) References Cited

PUBLICATIONS

"A static timing analysis environment using java architecture for safety critical real-time systems" Erik Yu-Shing Hu, Guillem Bernat, and Andy Wellings Real-time systems research group department of computer science University of York York, YO105DD, UK.

"Timing analysis for fixed-priority scheduling of hard real-time systems" Michael Gonzales Härbour, member. IEEE, Mark H. Klein, and John P. Lehoczky, member, IEEE.

Timing Analysis for Fixed-Priority scheduling of Hard Real-Time Systems; Michael Gonzalez Haerbour, Member. IEEE, Mark H. Klein, and John P. Lehoczky, Member IEEE, p. 13 to 28, IEEE Transactions of Software Engineering, vol. 20, No. 1, Jan. 1994.

A Static Timing Analysis Environment Using Java Architecture for Safety Critical Real-Time Systems; Erik Yu-Shing Hu, Guillem Bernat and Andy Wellings, Real-Time Systems Research Group, Department of Computer Science; University of York, York, YO105DD, UK.

S.K. Baruah, Dynamic- and Static-priority Scheduling of Recurring Real-Time Tasks, Journal of Real-Time Systems, 24, 93-128, 2003.

(Continued)

*Primary Examiner* — Djenane M Bayard
(74) *Attorney, Agent, or Firm* — Manabu Kanesaka

(57) ABSTRACT

The invention relates to a method for testing the real-time capacity of a system, especially a computer system, according to which a quantity of different tasks ($\tau$) is to be executed, system costs being incurred by the execution of each task ($\tau$). The aim of the invention is to provide an especially rapid and accurate method. To this end, in order to determine the total costs ($D_{bi}(I)$) for at least one time interval (I), the actual system costs ($D_{bi}(I)$) of the job of a first task are taken into account for said at least one first task, the actual system costs ($D_{bi}(I)$) of at least two jobs of the first task are taken into account for at least one first task, and other system costs are taken into account for at least one second task. The other system costs are determined by an approximation based on the actual system costs ($D_{bi}(I)$).

17 Claims, 6 Drawing Sheets

OTHER PUBLICATIONS

S. Baruah, D. Chen, S. Gorinsky, A. Mok. Generalized Multiframe Tasks. The International Journal of Time-Critical Computing Systems, 17, 5-22, 1999.

S. Baruah, A. Mok, L. Rosier. Preemptive Scheduling Hard-Real-Time Sporadic Tasks on One Processor. Proceedings of the Real-Time Systems Symposium, 182-190, 1999.

A. Burns, A. Wellings. HRT-HOOD: A Structured Design Method for Hard Real-Time Ada Systems. Elsevier, Oxford, 1995.

S. Chakraborty, S. Künzli, L. Thiele. Approximate Schedulability Analysis. 23rd IEEE Real-Time Systems Symposium (TRSS), IEEE Press, 159-168, 2002.

S. Chakraborty, T. Erlebach, L. Thiele. On the Complexity of Scheduling Conditional Real-Time Code. TIK Report No. 107, ETH Zurich, 2001.

D. Chen, A. Mok, S. Baruah. On Modeling Real-Time Task Systems. Lectures on Embedded Systems: Proceedings of The European Educational Forum School on Embedded Systems, in Lecture Notes in Computer Science, No. 1494, 153-169, Springer Verlag, 1998.

K. Gresser. Echtzeitnachweis Ereignisgesteuerter Realzeitsysteme [Real-time verification of event-controlled real-time systems]. Dissertation, VDI Verlag, Dusseldorf, 10(286), 1993. (in german).

J. Hromkovic. Algorithmics for Hard Problems. Texts in Theoretical Computer Science, Springer Verlag, 2003.

T.M. Lee. J. Henkel. W. Wolf. Dynamic Runtime Re-Scheduling Allowing Multiple Implementations of a Task for platform based Designs. 296-301. Proceedings of the Design and Test Conference in Europe, Date, IEEE Press, 2002.

C. Liu. J. Layland. Scheduling Algorithms for Multiprogramming in Hard Real-Time Environments. Journal of the ACM, 20(1), 46-61, 1973.

C. Ma, K. Shin. A user-customizable energy-adaptive combined static/dynamic scheduler for mobile communications. Proceedings of the Real-Time Symposium, 2000.

M. Spuri. Analysis of Deadline Scheduled Real-Time Systems, Research Report RR-2772, Inria, Le Chesnay Cedex, France 1996.

Michael Gonzalez Härbour Mark H. Klein and John P. Lehoczky. Timing Analysis for Fixed-Priority Scheduling of Hard Real-Time Systems. IEE Transactions on Software Engineering, vol. 20 No. 1, 1994.

Erik Yu-Shing Hu, Guillem Bernat and Andy Wellings. A Static Timing Analysis Environment Using Java Architecture for Safety Critical Real-Time Systems. Proceedings of the Seventh International Workshop on Object-Oriented Real-Time Dependable Systems 1530-1443/02, 2002.

FIG. 4

ALGORITHM ApproxFeasabilityTest
INPUT: ListOfEvents (e$_i$), testLimit
$U = \sum_i c_i/p_i$ IF U>100% => not feasible
$I_{max} = U/(1-U) \cdot max_{1 \leq i \leq n}(p_i - d_i)$;
// Test interval from [3]
$\forall e_i \in D_b$ : testlist.add($f_i, e_i$);
WHILE ($I_{act} \leq I_{max} \vee Liste \neq \{\ \}$)
   i = testlist.getNextDemand();
   $I_{act}$ = testlist.intervallForDemand(i);
   $D'_b = D'_b + c_i + (I_{act} - I_{old}) \cdot U_{ready}$
   IF ($D'_b > C_b(I)$ ) => not feasible
   IF ( $I_{act} < (k-1) \cdot p_i + f_i$ )
     testlist.add($I_{act} + p_i, e_i$)
   ELSE $U_{ready} = U_{ready} + c_i/p_i$
   $I_{old} = I_{act}$
END WHILE
=> feasible

FIG. 5

ALGORITHM Chakraborty

INPUT: ListofTasks {$e_i$}, testLimit $$I_{max} = U/(1-U) \cdot max_{1 \leq i \leq n}(p_i - d_i)$$

// Test interval from [3]

$$K = \frac{I_{max}}{testLimit}$$

FOR ($i \leftarrow 1$ to $\lfloor I_{max}/K \rfloor + 1$ )

IF ( $D_b(T, f_{max} + i \cdot K) > f_{max} + (i-1) \cdot K$ ) THEN

=> not feasible

END FOR

=> feasible

METHOD FOR TESTING THE REAL-TIME CAPABILITY OF A SYSTEM

The invention relates to a method for testing the real-time capability of a system, in particular of a computer system.

Analysis of the time response of embedded real-time systems is required for automation of the development of systems such as these. In order to ensure fixed time limits, tests relating to the scheduling capability have been carried out in detail in recent years [1], [2], [3], [5], [6], [7], [8], [9], [12]. [5] provides a good introduction to the field of real-time analysis.

[16] discloses a method for time analysis for periodic real-time task systems. In this method, tasks to be processed by a processor are considered with fixed priorities. While processing a task, it is possible for the processing of further tasks to be blocked. The block is taken into account in the form of additional system costs when calculating the system costs, for example the execution time, required for processing a task. The additional system costs are determined exactly.

[17] describes a method for exact calculation of the system costs actually consumed by the processor.

A simple sporadic task model is considered in the following text. This is based on the assumption of a set of tasks, with each task being described by an initial time a,
a relative time limit d (measured from the initial time an),
a processing time c for the worst case, and
a shortest interval or a shortest period p between two events in the task.

An event in a task can also be referred to as a job. Each job has its own start time. The start time is in the worst case obtained from the initial time a of the task and the interval or the period p. The processing time c and the time limit d for the task are assigned to each job. The time limit is in this case measured from the start time of the respective job. All tasks can be carried out on the same processor. A processor means an execution component of the system, which processes tasks. By way of example, tasks can be carried out by a CPU, electronic circuit modules or software components. The following description is based on tasks being scheduled on the basis of the earliest deadline first, the so-called EDF algorithm. In the case of the EDF algorithm, the task which has the shortest time interval before the end of the time limit d for that task is carried out first. It is also possible for the tasks to be scheduled using different scheduling methods.

If the time limits and the periods of the tasks are not the same, the complexity of the test for the scheduling capability is unknown [3]. So far, no algorithm exists with polynomial complexity. The best known algorithms are algorithms with pseudo-polynomial complexity. In order to allow an analysis such as this to be used for the scheduling capability of automatic analysis means, it is necessary to reduce the complexity of the test. This can be done by an approximation [10], so that a small error must be accepted in the final results of the algorithm. A first approach was the analysis according to Baruah et al. [3].

Baruah et al. have shown that this test need be carried out only as far as a maximum interval, $I_{max}$. In order to achieve pseudo-polynomial complexity, Baruah et al. considered only those sets of tasks which have a processor load level below a predetermined limit. This leads to an upper limit for the maximum interval, $I_{max}$.

In [14], Spuri describes an algorithm for response time analysis for EDF scheduling with pseudo-polynomial complexity [15]. However, the algorithm involves greater effort than the processor demand test.

The complexity of the abovementioned tests depends not only on the number of tasks but also on the ratio of their different periods.

Chakraborty et al. [6] have briefly presented a different approach, which solves this problem and leads to an algorithm with polynomial complexity. The algorithm is defined for an extended task model, the recurring real-time task model [1], [2]. A fixed number of time intervals are distributed uniformly over the maximum interval $I_{max}$. An accumulated processing time is checked only for these time intervals. In order to ensure the correct response of the test even for intervals between the time intervals, an approximation is carried out in which the accumulated processing time is compared with the available capacity of the system for the next shorter time interval. The maximum error in this approximation is restricted. The maximum error matches the interval between two time intervals. If the interval between the end of their execution and their time limit d is greater than the error for all of the jobs in all of the tasks, then the test is always successful. An approximation such as this allows a compromise between execution time and the algorithm error. A large error leads to only a small number of time intervals, and in consequence to a short execution time. A small error leads to a large number of time intervals to be checked, and to a long execution time. If a system includes tasks with a short time limit d, then the interval between the ends of their execution time and their time limits d is likewise short. In order to improve the prospect of acceptance of a system such as this, the test must have only a small error. This leads to long algorithm execution times. However, the algorithm invariably fails in the case of tasks for which the time limit d is identical to their processing time for the worst case.

The object of the present invention is to overcome the abovementioned disadvantages of the prior art.

BRIEF DESCRIPTION OF THE DRAWINGS

FIG. 4 is a superimposition test algorithm for an approximated feasibility test.

FIG. 5 is the algorithm from Chakraborty et al.

Figure 1:
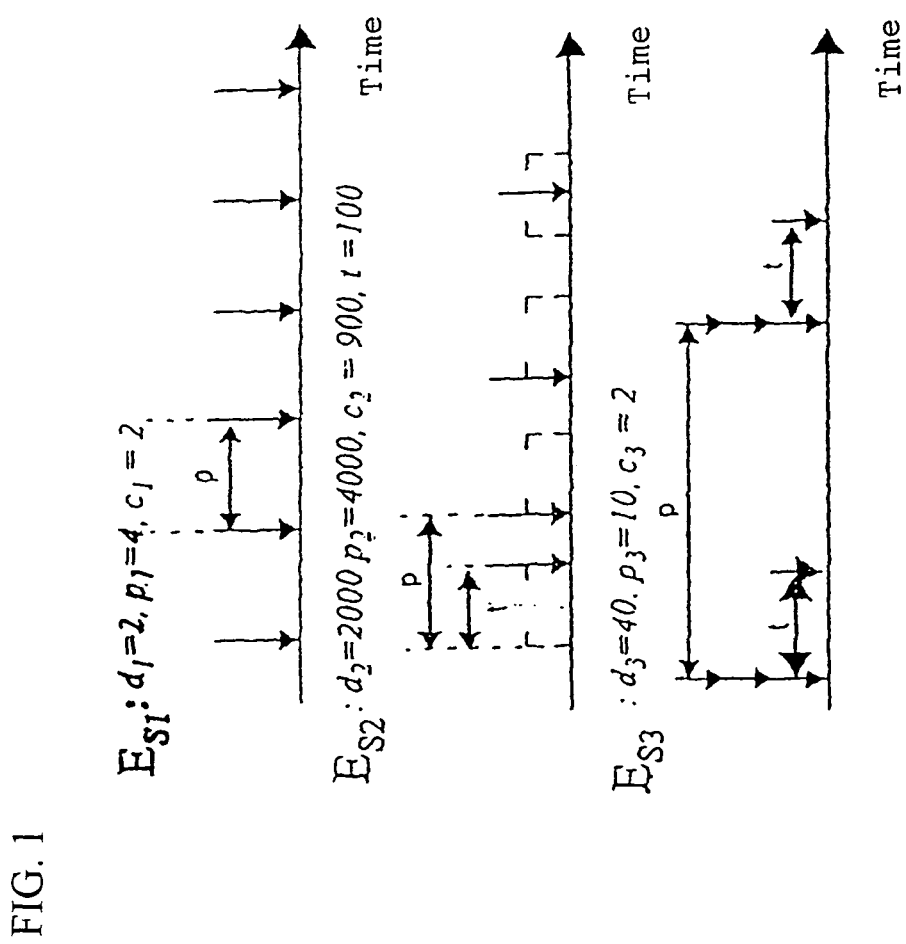
FIG. 1 is a graph of a periodic event sequence of $E_1$, $E_2$, and $E_3$.

The algorithm described by the method according to the invention is independent of the ratio and the magnitude of the time limits and intervals or periods. It uses a different type of error. The algorithm ensures that a processor with slightly better performance than that of an unknown optimum processor is accepted. An optimum processor such as this is a processor whose capacity cannot be reduced without making it impossible to run the system. The error is variable and leads to a scaleable algorithm for analysis. The use of the method according to the invention makes it possible to reach a compromise between the running time of the algorithm and the magnitude of the error.

The proposed method is suitable not only for carrying out a predictive real-time analysis but also for a real-time analysis which can be carried out during operation of the system. Thus, in particular, it is possible to determine whether the system as loaded with the current load still has a real-time capability. If the method according to the invention finds that this is no longer the case, countermeasures, such as the provision of additional resources, interruption of tasks or error handling, can be initiated in good time. The correctness of the proposed algorithm can be verified formally.

The load level on the system under consideration is described by system costs. The system costs can be calculated on the basis of the processing time which is required for processing of the tasks. However, they can also be calculated on the basis of the processor load level which is required for processing of the tasks. The real-time capability of the system is not regarded as given when a predetermined limit value is exceeded for the total system costs consumed in a time interval. The expression total system costs means the accumulated system costs which result from the processing of the tasks. Depending on the application, system costs for a time interval may, for example, be costs which have been consumed, the maximum required costs, costs incurred or required costs.

In the proposed invention further system costs from at least one second task are taken into account at least for one time interval. It is thus possible to omit the check of specific relatively long time intervals, and thus to considerably reduce the total effort for testing all of the relevant time intervals. The additional system costs are determined by an approximation on the basis of the actual system costs. The expression actual system costs for a task means those system costs which are actually consumed by the system during processing. The actual system costs for a task may, for example, be the execution time which the system actually requires to process that task. The actual system costs may, for example, be calculated exactly by so-called worst-case execution time analysis. The additional system costs make it possible to partially predict the costs which will be incurred in the relatively long time intervals which have been omitted. In contrast to the prior art, this prediction is produced specifically only for one subset of the tasks. Furthermore, in contrast to the prior art, system costs which cover two or more jobs in this task can also be taken into account for the first tasks. This makes it possible to increase the acceptance rate of the test. In particular, the acceptance rate for a set of tasks can be increased, with the difference between the time limits and the processing time being small, at least for one task. This is particularly applicable when, at least for that task with a small difference, the prediction of future costs is carried out only for time intervals which cover a plurality of jobs, for example at least two jobs. One interval covers two jobs in a task when, taking account of the shortest intervals and the relative time limits, the interval between the initial time of the first job in the task and the time limit for the second job in the task is not greater than the time interval. This also applies in a corresponding manner to any desired number of jobs in a task.

Depending on the predetermined application, the jobs in the task may occur either with a minimum time interval (sporadic case) or periodically (periodic case). However, a set of tasks may also include tasks from both cases. The method according to the invention makes it possible to cover analysis of both cases.

In one refinement of the invention, test limits are introduced, at least in some cases, for the tasks. In this case, additional system costs are taken into account only for those tasks whose test limit is reached within the time interval to be checked. A first task can become a second task on reaching the test limit. The test limits may be variable, that is to say they are not necessarily fixed in advance. The test limits make it possible to limit the ratio of the additional system costs to the total system costs. The ratio can be changed by variation of the test limits. The accuracy of the test can be increased by increasing the test limits. However, in some circumstances, it may be necessary to check more time intervals. The ratio can also be limited by using fixed test limits. The fixed test limit for a task advantageously represents a number of jobs in the task, with the test limit being reached when the time interval covers a large number of jobs, corresponding to this number. It is particularly advantageous to choose the same fixed test limit for all tasks, for example the same number of jobs. Fixed test limits such as these make it possible to limit the ratio of the component of the task in the total system costs to their additional system costs for each task, to the same value. The ratio can be used to estimate a maximum possible error and, for example, can be passed to the user. On the other hand, it is also possible for the user to preset a maximum possible error, on the basis of which the test limits are defined. The test limit may, for example, be represented by a numerical value.

In one advantageous embodiment, the additional system costs are calculated on the basis of the specific load level of a task. This can be determined by the quotient of the computation time divided by the period of the task. The maximum error for each task can be limited. It is possible for the maximum error to be independent of the length of the time interval to be considered. The specific capacity can sensibly be determined for the difference between the time interval and the test interval for that task. The maximum error for each task can be limited to twice its computation time.

The test limit preferably represents a number of jobs in the task. The test limit is reached in a time interval when the time interval covers a large number of jobs corresponding to that number. The error can in this case even be limited to the respective actual computation time for that task.

The total system costs can be calculated in steps. Time intervals are preferably investigated with increasing length. It is thus possible to determine the specific load level from the test limit for the difference between respectively successive time intervals, and for this to be added to the previous total costs as further system costs. The actual system costs of these approximated tasks are already included in the further system costs determined in this way. In consequence, there is no need to determine the actual system costs for the approximated tasks. The further system costs can be determined in one step for all tasks whose test limit has already been exceeded. In this case, time intervals are not tested for which exclusively system costs change for tasks whose test limit has already been reached.

It is possible to consider only groups of tasks. A procedure such as this is particularly worthwhile when they are on different priority levels.

The limit value for the total system costs consumed in one time interval can be described by a set of system costs. For example, the limit value can be described by a set of those system costs which the processor can process within the time interval associated with that limit value. It is also possible to define the limit value with the aid of the processor capacity. If a constant processor capacity is assumed, then the limit value can be defined by multiplying the length of the time interval by the capacity. When the limit value is defined in this way, twice the amount of system costs which can be processed are associated with a time interval of twice the length.

According to one advantageous refinement of the invention, different capacities can be associated with different time intervals in order to determine the limit value. This allows processors with a fluctuating capacity to be modeled better. The accuracy of the test for systems with processors such as these can be increased. According to a further refinement, different capacities may be associated with only some of the time intervals. The capacities are preferably allocated in order of increasing magnitude to time intervals with likewise increasing magnitude. This means that greater capacities are associated with longer time intervals, and smaller capacities are associated with shorter time intervals. In order to determine the limit value for time intervals with no associated capacity, it is possible to use that capacity which is associated with or is used for the next shorter time interval. The restriction to only some of the capacity changes allows the limit values to be calculated particularly efficiently. This applies in particular when using the approximation described above. In comparison to determination of the limit value on the basis of the assumption of a constant capacity, this allows considerably more accurate analysis with only a small amount of additional calculation effort.

All of the numerical values used in the method can be implemented in a discrete numerical system, thus making it easier to carry out the method, since there is no need for any complex floating-point operations.

The following explanation of the method according to the invention is based on the event stream model according to Gresser [9]. The method according to the invention may, however, also be developed on the basis of other models, or may be applied to other models.

The event stream model according to Gresser [9] describes the time relationships between two events for the worst case. The idea is to define a minimum time interval between one, two, three or more events by formal specification of the input stimuli. The model defines the maximum number of events in different predetermined time intervals. The following definitions are required in order to formulate the problem in a formal manner:

Definition 1. Time T

The time T is a monotonally arranged set of numbers $t \in R^+$ which are defined as multipliers for a predetermined physical time interval.

Each time $t_i$ can be described by the interval $I(0, t_i)$

Definition 2. Specific Time Interval

A specific time interval is an interval between two specific times: $I_s = (t_i, t_j)$.

Definition 3. Time Interval I

A time interval is a time period between two times $t_i$ and $t_j$: $I(I_s) = |t_i - t_j|$.

Definition 4. Processing Time c

The time interval which a processor requires to calculate a specific part of a software code.

Definition 5. Task τ

A task τ is described by the processing time c for the worst case and by the relative time limit d; and represents a part of a software code. The relative time limit is an interval which describes the maximum permissible processing time for the task τ: $\tau = (c, d)$.

For the purpose of the present invention, the expression time limits is used to mean relative, fixed time limits. At any given time, a processor can calculate only one task τ. The following text is based on the assumption of scheduling on the basis of the earliest deadline first (EDF) algorithm, which has been found to be particularly advantageous for carrying out the method according to the invention.

Definition 6. Event e

An event is a job for execution of a task τ at a specific time $t_r$ (job time):

$$e = (t_r, \tau)$$

$$t(e) = t_r$$

$$\tau(e) = \tau$$

Definition 7. Event Sequence E

An event sequence is an organized set of events:

$$E = \{e | (t(e_i) \geq t(e_j) \Leftrightarrow i \geq j)\}$$

Definition 8. Event Interval Function $n_i(E, I)$

The event interval function defines, for a specific time interval I, the number of events which occur within this time interval I:

$$n_i(E, I_s) = |\{e \in E | t_i \leq t(e) \leq t_j\}|$$

Definition 9. Homogenous Event Sequence $E_H$

A homogenous event sequence $E_H$ is an event sequence which comprises exclusively events from the same task:

$$E_H = \{e \in E | \tau(e_i) = \tau(e_j)\}$$

Definition 10. Periodic Event Sequence $E_p$

A periodic event sequence $E_p$ is a homogenous event sequence $E_H$ which comprises an infinite number of events which are separated by a fixed interval (the period p). The job time for the first event is the first job time a in a sequence:

$$E_p = \left( E_H \left| \begin{pmatrix} \forall\, e \in E_H \mid \exists\, k \in N_0^+ : (k*p + a = t(e)) \\ \forall\, k \in N_0^+ \mid \exists\, e \in E_H : (k*p + a = t(e)) \end{pmatrix} \right. \right)$$

A periodic event sequence $E_p$ is described by its period p, its first job time a and the value of the basic task τ, the processing time c for the worst case and the relative time limit d for the corresponding task τ:

$$E_p = (p_i, a_i, d_i, c_i)(*)$$

A periodic event sequence $E_p$ with an infinite period is an event sequence E which comprises a single event e.

Lemma 1:

Each event sequence E can be represented by a set of periodic event sequences $E_p$: $E = \{E_p\}$.

All of the periodic components in the event sequence E can be represented by a single periodic event sequence $E_p$. The others are represented by a periodic event sequence $E_p$ with an infinite period. However, the number of periodic event sequences $E_p$ for more general event sequences E may be rather large. For most systems, only a finite set of periodic event sequences $E_p$ is required. In the sporadic task system under consideration, each task τ can be described by just one periodic event sequence $E_p$, and by two and only two periodic event sequences $E_p$ if fluctuations are taken into account. Only one upper limit need be taken into account for the density of the events e in order to define a test algorithm:

Definition 11. Event Function $n_e$

The event function $n_e$ defines, for each time interval I, the number of events e which can occur in I in the worst case:

$$n_e(E, I) = \max\{n \in N_0^+ | \exists t \in T : n = n_j(E, (t, t+I))\}$$

The event function $n_e$ is a function which does not decrease monotonally. It is complex to obtain a description of this function from a predetermined event sequence E. For this reason, we consider the reciprocal function:

Definition 12. Event Stream Function a(n)

An event stream function a(n) defines, for each number n of events e, the minimum interval I in which n events can occur:

$$a(n) = \min\{I \in T | (\exists t \in T : n = n_e(E, I))\}$$

Definition 13. Event Stream $E_s$

An event stream $E_s$ is a specific case of an event sequence E in which all of the events e occur in their worst time relationship, which describes the event stream function a(n):

$$E_S = \{e \in E | \exists n \in N_0^* : I(0, t(e)) = a(n)\}$$

Definition 14. Event Stream Element

The event stream element is a periodic event sequence which is associated with an event stream $E_s$.

The time relationship for the worst case describes the density of the events e in the worst case. An interval a(n) is described by the job time interval of an event $e_i \in E_s$. The first event $e_1$ in the event stream $E_s$ represents the limit interval which as a maximum contains one event (which is always 0 in the limit case), the second event $e_2$ represents the interval which contains two events e, and the n-th event $e_n$ represents an interval with n events $e_n$.

Example:

The event sequence $E_1=\{0, p_1, 2p_1, 3p_1, \ldots\}$ in FIG. 1 is a periodic event sequence. The event stream $E_{s1}$ is thus given by $E_{s1}=\{(p_1, 0, d_1, c1)\}$.

The event sequence $E_2=\{0, p_2-t, 2p_2-t, 3p_2-t, \ldots\}$, in consequence $E_{s2}=\{(\infty, 0, d_2, c_2), (p_2, t, d_2, c_2)\}$. This is a periodic event sequence with elements which can fluctuate. The minimum interval between two events e in this event stream is p–t. This is the situation when an event occurs at the end of the fluctuation interval and the next event e occurs at the start of the next fluctuation interval.

The event sequence $E_3=\{0, 0, 0, t, p, p, p, t+p, 2p, 2p, 2p, t+2p, \ldots\}$.

In consequence, $E_{s3}=\{(p, 0, d_3, c_3), (p, 0, d_3, c_3), (p, 0, d_3, c_3), (p, t, d_3, c_3)\}$.

Note that a plurality of events e may have the same output time in one event sequence E.

The period of the sequence remains unchanged during the transformation of an event sequence E to an event stream $E_s$. An algorithm for real-time analysis can be carried out if all of the events e with a lesser density or the same density occur as described by the event stream $E_s$. It cannot be carried out if they occur with a greater density than is described by the event stream $E_s$. The use of the expression event stream $E_s$ allows the event function $n_e$ to be calculated easily:

$$n_i(E_S, I) = [((I-a_i)/p_i)+1], I \geq 0 \quad (*)$$

It should be noted that each event stream element describes a periodic event sequence $E_p$. The maximum number of events e in the interval I is then simply the sum of all the individual event stream elements:

$$\forall I \geq 0 \qquad n_e(E_S, I) = \sum_{i=1}^{n} [((I-a_i)/p_i)+1] \quad (*)$$

Example:

For I<p the number of events is $E_{s1}(I)$ 1, for p≦I≦2*p the value is 2 etc. Consider the situation in the interval I=T:

$$n_e(E_{S2}, p) = [((t-0)/\infty)+1] + [((t-t)/p)+1] = 2$$

Each event stream element produces one and only one event e.

A separate uniform event stream $E_s$ must be constructed for each task τ, since non-uniform event streams $E_s$ are not suitable for real-time analyses. If all of the tasks τ of the same type are independent, uniform event streams $E_s$ can simply be combined by combining the sets of the event stream elements. This event stream $E_s$ represents the density in the worst case for a single task τ.

Example:

$E_{s1}$ and $E_{s2}$ are two uniform event streams. The combined event stream is therefore:

$$E_{s12}=\{(\infty,0,d_2,c_2),(p_1,0,d_1,c_1),(p_2,t,d_2,c_2)\}=\{(\infty,0,\\ 2000,900),(4,0,2,2),(4000,t,2000,900)\}.$$

Limit Function for the Demand

In order to construct a real-time algorithm, it is necessary to calculate the maximum required workload on a processor in a predetermined time interval. This can be achieved by means of the limit function for the demand, which was initially defined by Baruah et al. [1-3] and Gresser [9], and was later also used by Buttazzo [5].

Definition 15. Limit Function for the Demand $D_b(I)$:

The limit function for the demand $D_b(I)$ is referred to as the maximum total execution demand, which is given by events e which have both their job time and their time limit within any-desired time interval of length I:

$$D_b(I) = \sum_{\substack{\forall i \\ I \geq d_i}} n_i(E_S, I - d_i) * c_i(*)$$

or $$D_b(I) = \sum_{\substack{\forall i \\ I \geq d_i}} [((I - d_i - a_i)/p_i) + 1] * c_i(*)$$

The only events e which are relevant for the real-time analysis are those which have both their job time t(e) and their time limit t(e)+$d_e$ within the interval I. These are all events e which occur in the interval I-$d_e$. The limit function for the demand corresponds to the event function, and is likewise a function which does not fall monotonally. In consequence, it is also possible to define a demand flow which corresponds to the event stream $E_s$:

Definition 16. Demand Flow Element $D_{bi}$

The demand flow element $D_{bi}$ is a description of a periodic progress of the demand and comprises an initial end time, the period p and the additional demand requirement c.

$$D_{bi}(I) = [((I-d_i-a_i)/p_i)+1]*c_i, I \geq d_i$$

Definition 17. Demand Flow

A demand flow is a set of demand flow elements $D_{bi}$ which describe the overall state of execution in the worst case.

In order to transfer an event stream $E_s$ to the associated demand flow, each event stream element is replaced by a demand flow element $D_{bi}$ with an initial end time $f_i=a_i+d_i$ and the same costs $c_i$ and the same time limit $d_i$ as the event stream element. There is no need for a demand flow to have a corresponding event stream. A demand flow can also describe the difference between two alternative event streams $E_s$ with different costs and time sequence. This concept allows a new formal representation of the limit function for the demand, and results from the definitions given above.

Feasibility Test

A feasibility test or a real-time analysis can be constructed using the limit function for the demand.

Lemma 2: Demand Criteria for the Processor

A system is feasible if the limit function for the demand is always less than or equal to unity: $\forall I > 0 \; D_b(I) \leq I$.

The major problem with use of the processor demand test is to find the length of the interval I. A test for scheduling capability must take account of all relevant events in order to ensure that all of the tasks are ended before their time limits. Since the limit function for the demand $D_b(I)$ is a discontinuous function, each event defines a relevant test point for the analysis algorithm defined further below. The run-time complexity of the analysis algorithm depends on the length of the interval I.

Definition 18. Feasibility Interval $I_{max}$

A time interval $I_{max}$ is referred to as a feasibility interval if:

$$(\exists I > 0) | (D_b(I) > I) \Rightarrow \exists I': 0 \leq I' \leq I_{max} | (D_b(I') > I')$$

If the processor demand test for the time interval I fails, a time interval I'≦$I_{max}$ exists for which the processor demand test will likewise fail. In order to indicate the feasibility of a predetermined task system, it is necessary to test only intervals I<$I_{max}$. Baruah et al. specify a feasibility interval such as this:

Lemma 2:

Assuming U=Σ$c_i/p_i$ is the maximum capacity used. $I_{max}$ is then a feasibility interval.

$$I_{max}=(U/(1-U))*\max_{1\leq i\leq n}(p_i-d_i)$$

If U is limited, the demand criterion for the processor can be tested in pseudo-polynomial time. A few better feasibility intervals are specified in [15]. All of these intervals are subject to a problem if $D_b(I)$ contains a plurality of event streams whose periods are subject to a large scatter.

Example:

Consider $E_{s1}$ and $E_{s2}$ in FIG. (1).

$$U=2/4+900/4000=77.5\%.$$

The test interval depends only on $p_2$. Thus $I_{max}$=0.775/0.225*(4000−2000)=6889. Two test points (for the times 2000 and 6000) are therefore required for $e_2$, while more than 1700 test points are required for $e_3$.

It is obvious that the complexity of the processor demand test also depends on the various periods of the set of tasks τ. In order to avoid this problem, the invention proposes an approximation which is independent of the predetermined periods. The next section describes an approximation such as this.

The approximation is based in particular on separately reducing the number of test points for each demand flow by construction of an approximated demand flow element function $D'_{bi}(I)$ and superimposition of all the approximations for an approximated limit function for the demand $D'_b(I)$. A separate test interval is thus defined for each demand flow element $D_b i$.

Definition 19. Maximum Test Interval $I_m(e_i)$

The maximum test interval $I_m(e_i)$ for the demand flow element $e_i$ is the interval which contains k+1 test points for $e_i$:

$$I_m(e_i)=k*p_i+f_i$$

It should be noted that a demand flow element $D_{bi}$ is described by its initial end time $f_i$ and its period $p_i$.

Definition 20. Approximated Demand Flow Element Function $D'_{bi}(I)$ $$D'_{bi}(I) = \begin{cases} D_{bi}(I_m(e_i)) + c_i/p_i * (I - I_m(e_i)) & I > I_m(e_i) \\ D_{bi}(I) & I \leq I_m(e_i) \end{cases}$$

Figure 2:
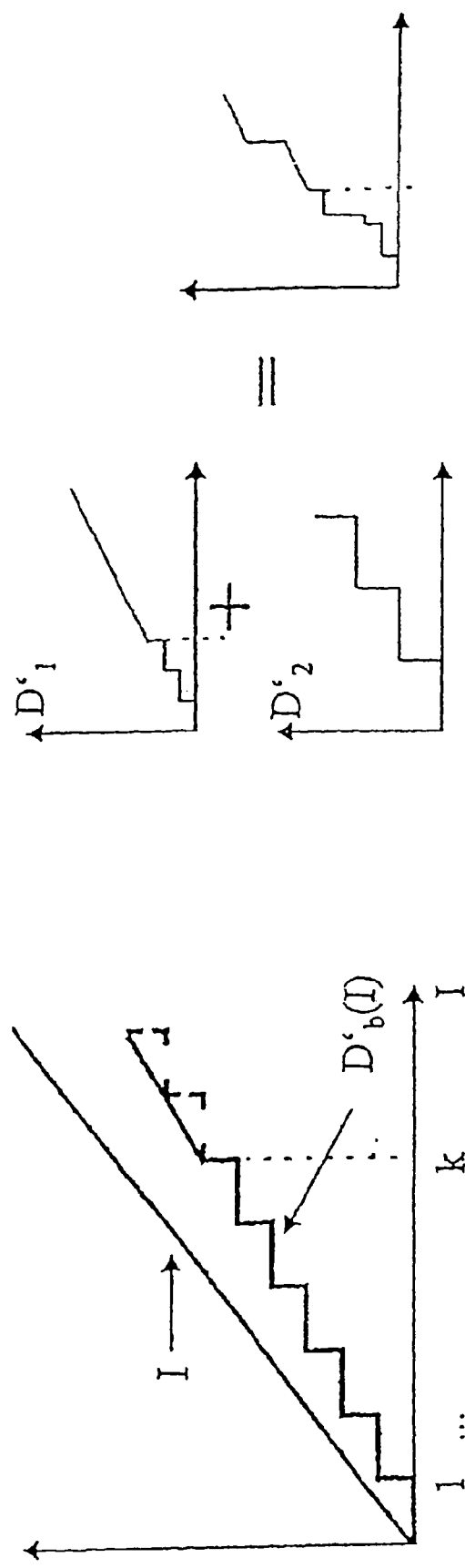
FIG. 2 is a graph showing the approximation of the limit function for the demand by superimposition.

As FIG. 2 shows, the approximated demand flow element function is always equal to or greater than the demand flow element function. It also depends on $E_s$, of course. Since $c_i/p_i\leq 1$, all that is necessary is to check all of the test points as far as $I_m(e_i)$.

Definition 21. Approximated Limit Function for the Demand $D'_b(I)$

The approximated limit function for the demand $D'_b(I)$ is a superimposition of all of the approximated demand flow element functions (FIG. 2, right-hand side)

$$D'_b(I)=\Sigma_{\forall j}D'_{bj}(I)$$

Since the magnitude of each approximated element is at least equal to the magnitude of the precise element, the added-up magnitude of the approximated elements is also at least equal to the magnitude of the limit function for the demand.

The critical test points of $D'_b(I)$ are all of the test points for the elements $D'_{bi}(I)$. For intervals greater than $I_m(e_i)$ the approximated costs for the events $e_i$ must be taken into account for each remaining test interval in the demand flow elements.

Example:

Let us once again consider $E_{s1}$ and $E_{s2}$ from FIG. 1. (Assume that k=100). The maximum number of test points is $I_m(e_3)$=398. The next test point is the first test point of event $e_2$, $I_2$=0*$a_2$+$d_2$=2000. The remaining test points for event $e_1$ are jumped over. The precise value for the demand of $I_2$ would be $D_b(I_2)$=$c_2$+500*$c_1$ and the precise value of $D'_b(I_2)$ is $D'_b(I_2)$=$c_2$+500.5*$c_1$.

The error in the approximation is given by the difference between the limit function for the demand $D_b(I)$ and the approximated limit function for the demand $D'_b(I)$. The error in the example is less than 0.1%. This means that the feasibility is ensured for a processor whose capacity is 0.1% greater than that of the optimum processor.

Lemma 2:

Assume that P is a processor with a capacity C(I) and that P' is a processor with the capacity C'(I)=C(I)+1/k*C(I). If the feasibility test for the processor P is successful using the limit function for the demand $D_b(I)$ (that is to say ∀I:C(I)≧$D_b(I)$), then the feasibility test will also be successful when using the approximated limit function for the demand $D'_b(I)$. This means that:

$$(D'_b(I)-D_b(I))/D_b(I)\leq 1/k=(C'(I)-C(I))/C(I)$$

Figure 3:
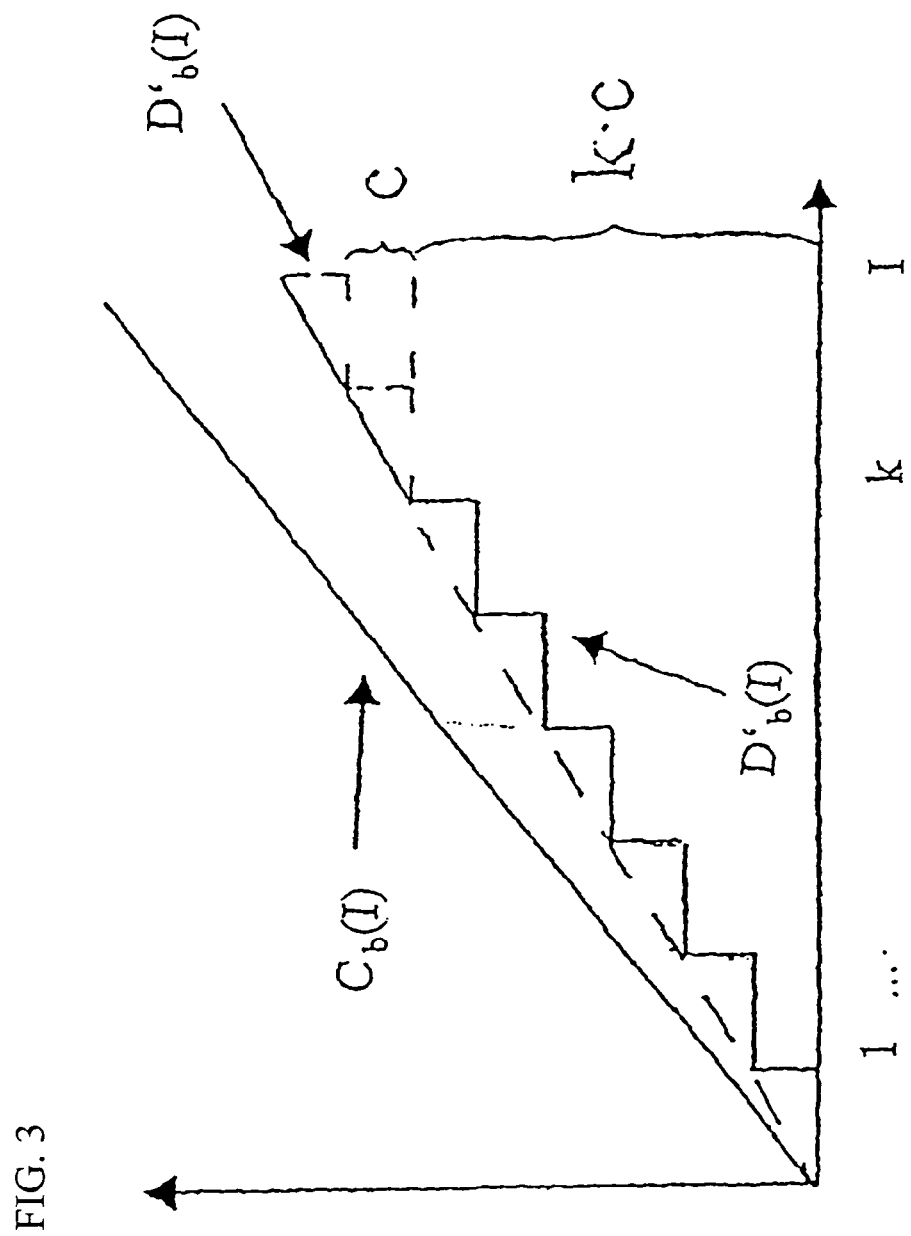
FIG. 3 is a graph showing the error in the approximation.

The error can thus be limited by the test limit k. A test limit k of 100 intervals leads to a maximum error of 1%, and a limit of 1000 leads to an error of 0.1%. The reason for this is illustrated in FIG. 3. If the test limit k is reached and the approximation starts, the demand already includes k*$c_i$ costs of $D_{bi}$. The maximum error which is caused by the approximation of the events $e_i$ is limited to 1*$c_i$. In the worst case, the ratio between the error and the total costs is less than $c_i$/k*$c_i$=1/k.

By way of example, an algorithm which is based on the present invention is described in the following text. For a powerful algorithm, there is no need to calculate the limit function for the demand $D_b(I)$ for each test interval separately. FIG. 4 shows a complete algorithm for an approximated feasibility test. First of all, this initializes the test list with the first instance of all of the demand flow elements $D_{bi}$ using their end times $f_i$ as the initial time. It then processes this list with a rising sequence of the test intervals. For each event $e_i$, it adds the corresponding costs $c_i$ to the accumulated costs. It checks whether the accumulated costs are higher than the computation time for the current test interval, the test would then fail. If the maximum number of test intervals for this element $e_i$ has not yet been reached, the next instance of this element $e_i$ is included in the test list. Its interval from the instantaneous test interval is $p_i$. The test list at any time thus contains at most one test point from each demand flow element. If the maximum number of test points for one element $e_i$ has been reached, its load level $c_i/p_i$ is added to $U_{ready}$. In this case, the next test point is not included in the test list. The approximated costs $approx_i$ are likewise added for each test interval. The calculation of these costs is given by $approx_i$=($I_{act}-I_{old}$)*$U_{ready}$.

The complexity of the original problem is unknown. Only pseudo-polynomial solutions are known at the moment.

Assume that n is the number of demand limit elements and that k is the maximum number of test points for each element $e_i$. The number of demand limit elements for the sporadic task system is equal to the number of tasks τ. The value k is a variable which can be selected and influences not only the complexity but also the algorithm error. A compromise is therefore possible between the algorithm running time and the error. The error $\epsilon$ is $\epsilon=1/k$. Each test point must be inserted into a sorted list (O(log n)). The complexity of the approximated feasibility test is thus O(n*logn*1/E). The given analysis error $\epsilon$ places a condition on the processor P, which is used in the final implementation of the system. In order to include all of the time limits in the system under consideration, this processor P is at most $\epsilon$ percent faster than the unknown optimum processor.

In comparison to the algorithm proposed according to the invention, the algorithm of Baruah et al. [3] has pseudo-polynomial complexity, which depends on the number of tasks, the overall load level and the interval between the periods. The complexity of the algorithm given by Chakraborty et al. [6] is comparable to that of the algorithm according to the invention. However, the algorithm according to Chakraborty et al. [6] uses a different type of error.

FIG. 5 shows a simplified version of the algorithm from Chakraborty et al. [6]. The performance of the algorithm according to the invention will be compared with the algorithm from Chakraborty et al. [6] in the following text. For this purpose, the algorithm according to Chakraborty et al. [6] was implemented subject to the same constraints as the algorithm according to the invention in Java, which runs on MacOS X on a 1 GHz PowerPC.

Two case studies are considered: the first example is based on [4] and models the Olympus Attitude and Orbital Control System for satellites. This example includes 10 periodic and 4 sporadic tasks, and is shown in Table 1.

The second example was originally produced by Ma and Shin [13] and can also be found in [11]. The model describes an application for a palm pilot with 13 different tasks $\tau$. All of the tasks $\tau$ have time limits, whose periods are equal. In order to define a more difficult problem for the experiment, we have set the time limits for the tasks $\tau_7$ to 100 ms, instead of 150 ms as in the original model.

We'll consider the experiment using the set of tasks for the Olympus Attitude and Orbital Control System. This is shown in the first seven lines of Table 2, and is referred to by the expression SAT. If we assume an approximation error of 0.05%, the new approximation ends the test for scheduling capability after 114 ms (100 rows in 11423 ms), while the algorithm according to Chakraborty et al. requires 228 ms. Despite the fact that a feasibility schedule exists for the set of tasks $\tau$, the algorithm according to Chakraborty et al. fails in those situations in which it uses a selected error of 50%, 5%, 1% and 0.59. In all of these cases, the algorithm according to the invention achieves results. For this reason, it is possible to use the superimposition algorithm to carry out an analysis of the scheduling capability in 17 ms, with an expected error of 1%.

Apart from the approximation overhead, the complexity of the algorithm according to the invention is always less than or equal to the complexity of the exact algorithm, even for a very small error. The complexity of the algorithm according to Chakraborty et al. increases as the error becomes smaller. The density of the test intervals may therefore be greater than is necessary for the exact algorithm.

In the example of the palm pilot, the results show the same trend. The algorithm according to the invention tolerates the set of tasks $\tau$ with an error of 5%, while the algorithm according to the prior art requires a smaller error (the experiments have shown that an error of 0.2% is sufficient). If both algorithms are carried out with an error of 0.01, which is close to the optimum processor, then the algorithm according to the invention requires 49 ms in comparison to 1817 ms which is required by the algorithm according to Chakraborty et al. [6].

Figure 6A:
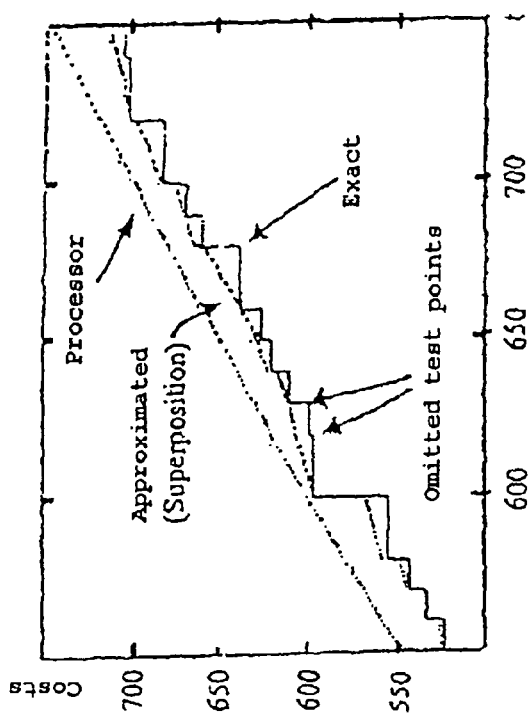
FIG. 6(a) is a graph showing the experiment with a palm pilot according to the Chakraborty algorithm.
Figure 6B:
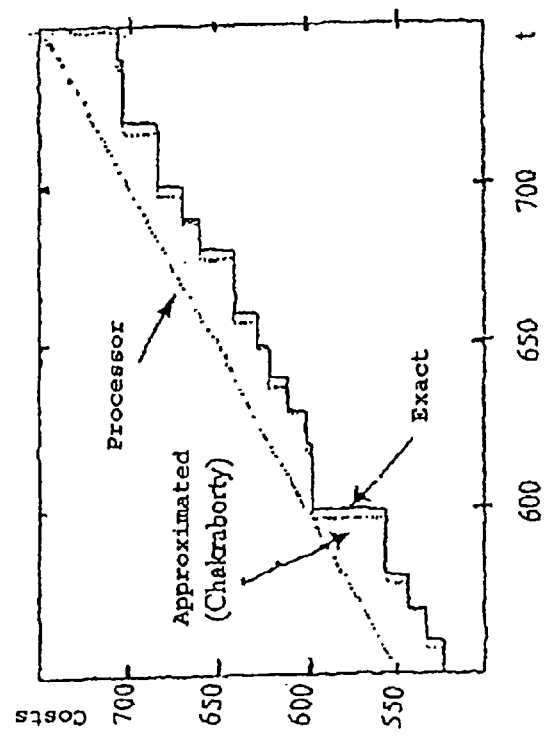
FIG. 6(b) is a graph showing the experiment with a palm pilot according to the algorithm of the super imposition approach.

FIG. 6 shows the reason for this behavior, and contains a section from a test run of the two algorithms, compared with the exact solution. A run of the algorithm according to Chakraborty et al. [6] with an error of 0.1 is shown in a). The error is too small to omit any test point in this section of the run. Nevertheless, the approximated demand function produced by the algorithm according to Chakraborty et al. [6] is always at a time before the exact solution. Using this algorithm, it is therefore impossible to arrive at the exact solution, even if an infinite number of test points are considered. The same section of the run with the algorithm according to the invention and using an error of 5% is shown in b). The error allows some of the test points to be omitted. Nevertheless, the approximation for the critical test points is closer to the exact solution than the approximation according to Chakraborty et al.

The method according to the invention can be carried out while the tasks are being processed by the system. Essentially, it is possible to determine at the same time as the processing of the tasks whether the tasks can be processed by the system in real time. If it is found that tasks to be processed by the system cannot be processed in real time, measures can be taken at an early stage. The measures may, for example, be provision of additional resources for processing of the tasks, interruption of tasks, or initiation of error handling.

The method according to the invention can be provided on a chip or on some other hardware as a program for carrying out the method. The method can also be integrated on the chip or in hardware, on a hardware basis. It is also possible for the program for carrying out the method to be stored on a storage medium, such as a CD, DVD or hard disk.

REFERENCES

[1] S. K. Baruah, *Dynamic- and Static-priority Scheduling of Recurring Real-Time Tasks*, Journal of Real-Time Systems, 24, 93-128, 2003.

[2] S. Baruah, D. Chen, S. Gorinsky, A. Mok. *Generalized Multiframe Tasks*. The International Journal of Time-Critical Computing Systems, 17, 5-22, 1999.

[3] S. Baruah, A. Mok, L. Rosier. *Preemptive Scheduling Hard-Real-Time Sporadic Tasks on One Processor*. Proceedings of the Real-Time Systems Symposium, 182-190, 1999.

[4] A. Burns, A. Wellings. *HRT-HOOD: A Structured Design Method for Hard Real-Time Ada Systems*. Elsevier, Oxford, 1995.

[5] G. Buttazzo, *Hard Real-Time Computing Systems: Predictable Scheduling Algorithms and Applications*. Kluwer Academic Publishers, 1997.

[6] S. Chakraborty, S. Künzli, L. Thiele. *Approximate Schedulability Analysis*. 23rd IEEE Real-Time Systems Symposium (TRSS), IEEE Press, 159-168, 2002.

[7] S. Chakraborty, T. Erlebach, L. Thiele. *On the Complexity of Scheduling Conditional Real-Time Code*. TIK Report No. 107, ETH Zurich, 2001.

[8] D. Chen, A. Mok, S. Baruah. *On Modeling Real-Time Task Systems*. Lectures on Embedded Systems: Proceedings of The European Educational Forum School on Embedded Systems, in Lecture Notes in Computer Science, No. 1494, 153-169, Springer Verlag, 1998.

[9] K. Gresser. *Echtzeitnachweis Ereignisgesteuerter Realzeitsysteme* [Real-time verification of event-controlled real-time systems]. Dissertation, VDI Verlag, Dusseldorf, 10(286), 1993. (in german).

[10] J. Hromkovic. *Algorithmics for Hard Problems*. Texts in Theoretical Computer Science, Springer Verlag, 2003.

[11] T. M. Lee. J. Henkel. W. Wolf. *Dynamic Runtime Re-Scheduling Allowing Multiple Implementations of a Task for platform based Designs*. 296-301. Proceedings of the Design and Test Conference in Europe, DATE, IEEE Press, 2002.

[12] C. Liu. J. Layland. *Scheduling Algorithms for Multiprogramming in Hard Real-Time Environments*. Journal of the ACM, 20(1), 46-61, 1973.

[13] C. Ma, K. Shin. *A user-customizable energy-adaptive combined static/dynamic scheduler for mobile communications*. Proceedings of the Real-Time Symposium, 2000.

[14] M. Spuri. *Analysis of Deadline Scheduled Real-Time Systems*, Research Report RR-2772, INRIA, Le Chesnay Cedex, France 1996.

[15] J. A. Stankovic, M. Spuri, K. Ramamritham, G. C. Buttazzo. *Deadline Scheduling for Real-Time Systems EDF and Related Algorithms*. Kluwer Academic Publishers, 1998.

[16] Michael Gonzalez Härbour Mark H. Klein and John P. Lehoczky. *Timing Analysis for Fixed-Priority Scheduling of Hard Real-Time Systems*. IEE Transactions on Software Engineering, Vol. 20 No. 1, 1994.

[17] Erik Yu-Shing Hu, Guillem Bernat and Andy Wellings. *A Static Timing Analysis Environment Using Java Architecture for Safety Critical Real-Time Systems*. Proceedings of the Seventh International Workshop on Object-Oriented Real-Time Dependable Systems 1530-1443/02, 2002.

The invention claimed is:

1. A method for testing a real-time capability of a computer system, in which a set of different tasks ($\tau$) is provided, wherein:
  at least some of the tasks ($\tau$) are requested and processed repeatedly by said system, and
  a job is defined by each processing of one task ($\tau$) and wherein each job causes system costs, the method comprising:
  determining that the real-time capability of the system is not given when a total system costs limit value which is predetermined for a time interval (I) is exceeded for total system costs ($D_b(I)$) consumed in this time interval, and wherein the total system costs ($D_b(I)$) for the time interval (I) are determined by:
  setting test limits for each task to be carried out in the time interval (I), the test limits being determined by a number of jobs executed for each task,
  determining first tasks ($\tau$), whose test limit ($k_i$) is not reached in said time interval (I),
  determining second tasks ($\tau$) whose limit ($k_i$) is reached in said time interval (I),
  determining actual system costs ($D_{bi}(I)$) for 1) said first tasks, wherein said actual system cost ($D_{bi}(I)$) for said first tasks comprises the costs of at least two jobs of each of said first tasks, and 2) system costs for said second tasks, which are determined by an approximation on a basis of said actual system costs ($D_{bi}(I)$), with the approximation being calculated on basis of a specific load level on said system by said second tasks ($\tau$),
  wherein a specific load level is taken into account for an interval which results from the difference between said time interval (I) and a second interval ($I_m(e_i)$), with the second interval ($I_m(e_i)$) covering precisely the last job ($e_i$) which was completely located in both time intervals in the task, and
  wherein approximate system costs are calculated for the interval (I) as follows:

$$D_{bi}(I_m(e_i)) + c_i/p_i * (I - I_m(e_i)), \text{ where } I > I_m(e_i).$$

2. The method as claimed in claim 1, wherein groups of tasks are taken into account for determination of said total system costs ($D_b(I)$).

3. The method as claimed in claim 1, wherein at least one task ($\tau$) recurs at a minimum time interval.

4. The method as claimed in claim 1, wherein at least one task ($\tau$) recurs periodically with a period ($p_i$).

5. The method as claimed in claim 1, wherein the system costs are calculated on the basis of a processing time which is required for processing of the tasks ($\tau$).

6. The method as claimed in claim 1, wherein the system costs are calculated on the basis of an upper limit of the processing time which is required in the worst case.

7. The method as claimed in claim 1, wherein the system costs are calculated on the basis of a load level, which is required for processing of the tasks ($\tau$), on an execution component, preferably a CPU, in the system.

8. The method as claimed in claim 1, wherein the limit value is determined on the basis of the capacity of said system available in the time interval (I).

9. The method as claimed in claim 1, wherein said total system costs ($D_b(I)$) are determined for discrete time intervals (I) which have an initial time and an end time.

10. The method as claimed in claim 9, wherein the end time is one end of a time limit of a job in the task ($\tau$).

11. The method as claimed in claim 1, wherein the specific load level is calculated as a quotient of the processing time ($c_i$) divided by a period ($P_i$) of the task ($\tau$).

12. The method as claimed in claim 1, wherein the task ($\tau$) which is processed first by the system is that for which the end of the time limit is closest in time.

13. The method as claimed in claim 1, wherein the tasks ($\tau$) are processed by the system in a sequence which is predetermined by a priority.

14. The method as claimed in claim 1, wherein the tasks ($\tau$) are described by an event stream model.

15. The method as claimed in claim 1, wherein the method is carried out while the tasks ($\tau$) are being processed by said system.

16. The method as claimed in claim 1, wherein at least one of the following measures is taken if it is found that tasks to be processed by the system cannot be processed in real time: provision of additional resources for processing of the tasks, interruption of tasks, initiation of error handling.

17. A storage medium having a program for carrying out the method as claimed in claim 1.

* * * * *